(12) United States Patent
Kitani (10) Patent No.: US 10,718,700 B2
(45) Date of Patent: Jul. 21, 2020

(54) WEAR TESTING DEVICE

(71) Applicant: The Yokohama Rubber Co., LTD., Minato-ku, Tokyo (JP)

(72) Inventor: Yuto Kitani, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 16/327,294

(22) PCT Filed: May 16, 2017

(86) PCT No.: PCT/JP2017/018276
§ 371 (c)(1),
(2) Date: Feb. 21, 2019

(87) PCT Pub. No.: WO2018/037639
PCT Pub. Date: Mar. 1, 2018

(65) Prior Publication Data
US 2019/0226961 A1    Jul. 25, 2019

(30) Foreign Application Priority Data
Aug. 23, 2016  (JP) .................... 2016-162461

(51) Int. Cl.
*G01N 3/56* (2006.01)
(52) U.S. Cl.
CPC ................. *G01N 3/56* (2013.01)
(58) Field of Classification Search
CPC ........................................ G01N 3/56
USPC .......................................... 73/7
See application file for complete search history.

(56) References Cited

U.S. PATENT DOCUMENTS

| | | | | |
|---|---|---|---|---|
| 2,333,599 A | * | 11/1943 | Terry | B29B 17/0206 157/13 |
| 2,769,283 A | * | 11/1956 | Brown | B29B 17/0206 451/227 |
| 3,899,917 A | * | 8/1975 | Kisbany | G01N 3/56 73/8 |
| 4,969,355 A | * | 11/1990 | Doi | G01M 17/022 73/146 |
| 4,995,197 A | * | 2/1991 | Shieh | B24B 5/366 451/1 |
| 5,448,910 A | * | 9/1995 | Yurjevich | G01M 17/022 73/146 |

(Continued)

FOREIGN PATENT DOCUMENTS

| | | |
|---|---|---|
| CA | 2035414 | 8/1991 |
| JP | H02-0210243 | 8/1990 |

(Continued)

OTHER PUBLICATIONS

International Search Report for International Application No. PCT/JP2017/018276 dated Jul. 18, 2017, 4 pages, Japan.

*Primary Examiner* — Marrit Eyassu
(74) *Attorney, Agent, or Firm* — Thorpe North & Western (57) ABSTRACT

A wear testing device includes a plurality of holding portions that hold rubber samples. The rubber samples held by each of the plurality of holding portions are independently and simultaneously pressed against a circumferential surface of a rotation body in rotation by a pressing mechanism so that abrasion debris of each of the rubber samples produced via this contact falls downward.

7 Claims, 6 Drawing Sheets

(56) References Cited

U.S. PATENT DOCUMENTS

| | | | |
|---|---|---|---|
| 6,269,690 B1* | 8/2001 | Shimizu | B60C 11/24 |
| | | | 73/146 |
| 2001/0003914 A1* | 6/2001 | Muraoka | G01N 19/02 |
| | | | 73/8 |
| 2002/0194894 A1* | 12/2002 | Srinivasan | G01N 3/56 |
| | | | 73/7 |
| 2012/0186324 A1* | 7/2012 | Neugebauer | G01N 3/56 |
| | | | 73/8 |
| 2013/0036790 A1* | 2/2013 | Hirayama | G01N 3/56 |
| | | | 73/8 |
| 2013/0036791 A1* | 2/2013 | Shibata | G01N 3/56 |
| | | | 73/8 |
| 2017/0284915 A1 | 10/2017 | Hou | |

FOREIGN PATENT DOCUMENTS

| | | | |
|---|---|---|---|
| JP | H05-087720 | | 4/1993 |
| JP | 3003469 | | 10/1994 |
| JP | H07-146217 | | 6/1995 |
| JP | 2007-292587 | | 11/2007 |
| JP | 2007292587 A | * | 11/2007 |
| JP | 2015-116576 | | 6/2015 |
| WO | WO 2016/042998 | | 3/2016 |

* cited by examiner

WEAR TESTING DEVICE

TECHNICAL FIELD

The present technology relates to a wear testing device and particularly relates to a wear testing device capable of easily determining the relative wear resistance of a plurality of rubber samples.

BACKGROUND ART

In the related art, a DIN (German Institute for Standardization) abrasion tester and a Williams abrasion tester are known testers for evaluating the wear resistance of rubber. These testers perform a test basically on one rubber sample at a time. Thus, to obtain test results from a plurality of rubber samples, sufficient time is needed or a plurality of testers are needed.

An example of a device that simultaneously tests a plurality of rubber samples is a testing device in which a plurality of rubber samples (test pieces) are attached to a first shaft and a plurality of counterpart pieces are attached to a second shaft (see Japan Utility Model Patent No. 3003469). This testing device has a structure whereby the opposing rubber samples and the counterpart pieces are pressed together at a predetermined pressing force by a pressing device and are rotationally driven while running against one another to wear the rubber samples.

However, this testing device has a structure whereby the rubber samples are pressed against the counterpart pieces as a group and not individually. Thus, when rubber samples having a different amount of wear per unit time are simultaneously tested, the pressing force against the relatively easily worn rubber sample is reduced. This prevents an accurate determination of the relative wear resistance of the rubber samples, and thus there is room for enhancement.

SUMMARY

The present technology provides a wear testing device capable of easily determining the relative wear resistance of a plurality of rubber samples.

A wear testing device according to an embodiment of the present technology includes:

a holding portion that holds a rubber sample;
a rotation body including a circumferential surface that comes into contact with the rubber sample; and
a pressing mechanism that applies a pressing force on the rubber sample held by the holding portion toward the circumferential surface;
the wear testing device including a plurality of holding portions, and the rubber sample held by each of the plurality of holding portions being independently and simultaneously pressed against the circumferential surface of the rotation body in rotation such that abrasion debris produced via contact between each of the rubber samples and the circumferential surface falls downward.

According to an embodiment of the present technology, in testing the wear resistance of the plurality of rubber samples, the rubber samples are independently and simultaneously pressed against the circumferential surface of the rotating rotation body. This allows the relative wear resistance of the rubber samples to be accurately determined without the wear condition of the rubber samples being a factor. Furthermore, because the abrasion debris of the rubber samples produced via contact between the rubber samples and the circumferential surface falls downward. This allows the relative wear resistances of the rubber samples to be easily determined, simply by visually observing the abrasion debris and comparing the amounts to one another.

DETAILED DESCRIPTION

A wear testing device according to embodiments of the present technology will be described below with reference to the drawings.

Figure 1:
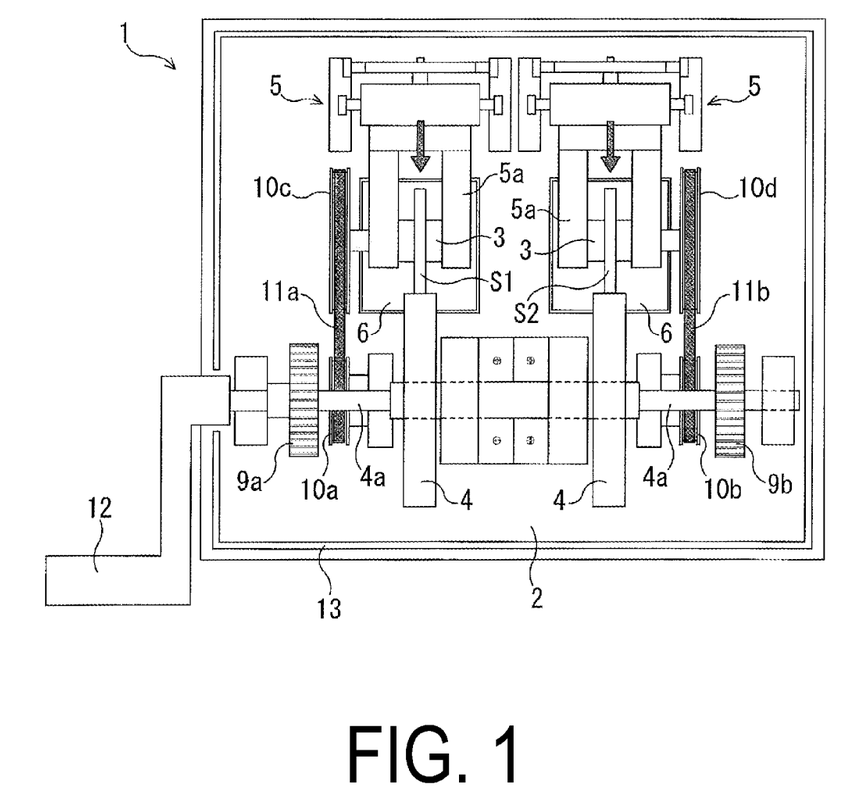
FIG. 1 is an explanatory diagram illustrating a wear testing device according to an embodiment of the present technology in a plan view.
Figure 2:
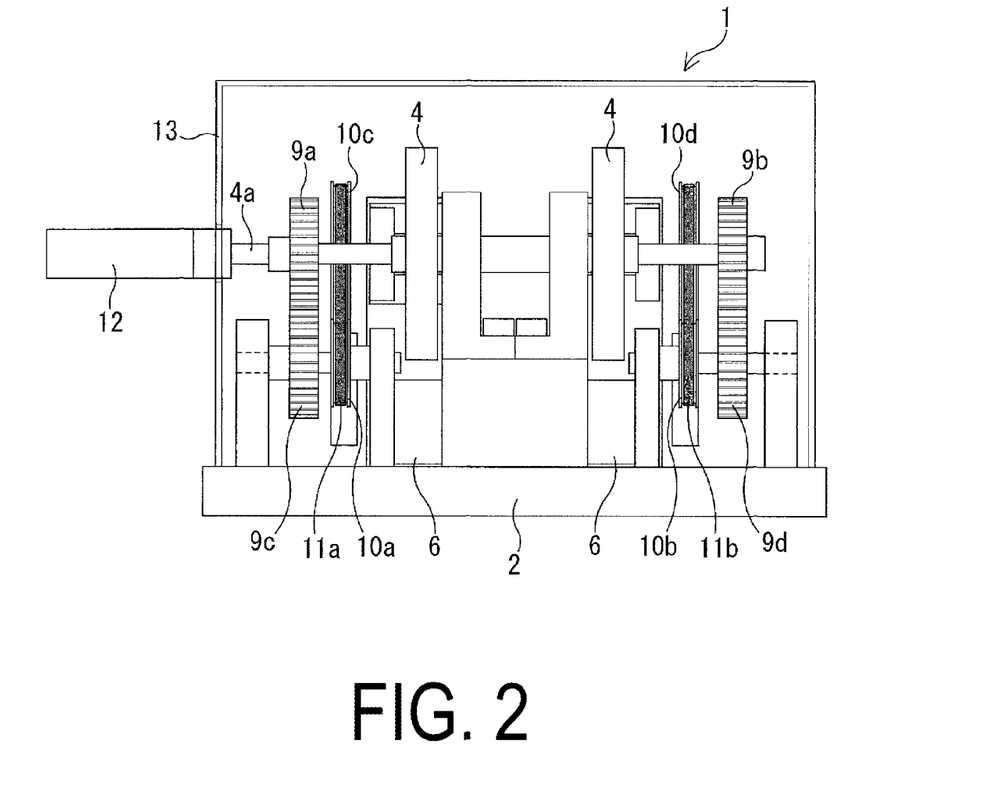
FIG. 2 is an explanatory diagram illustrating the wear testing device of FIG. 1 in a front view.
Figure 3:
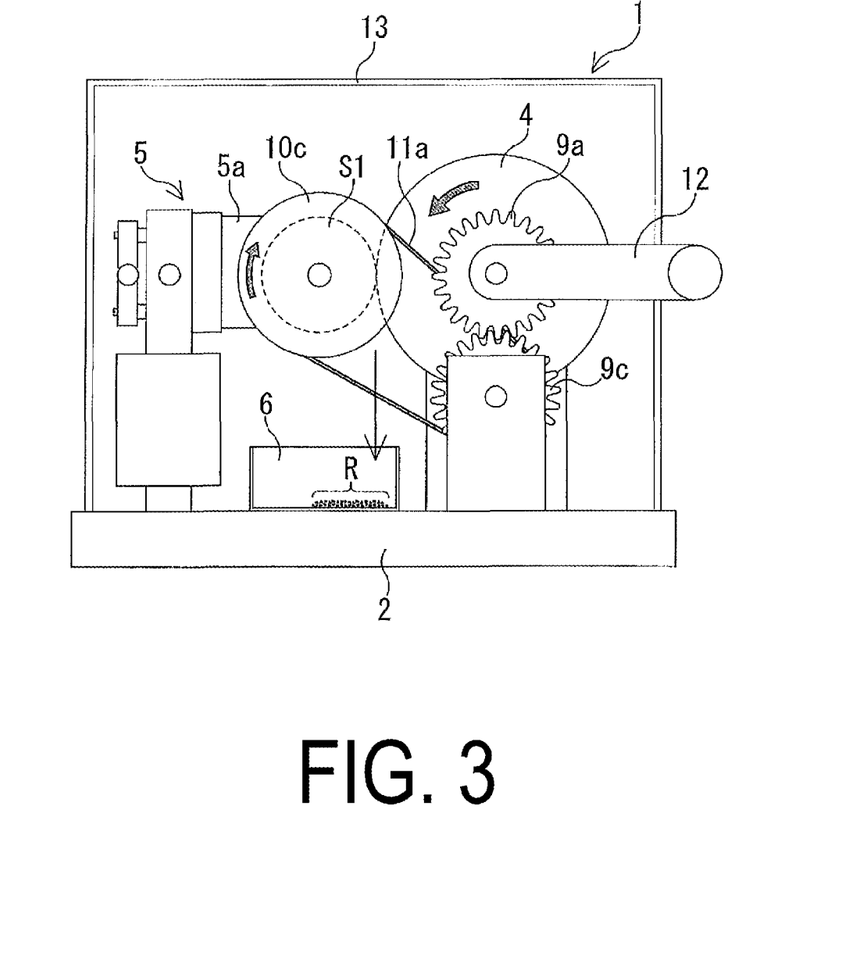
FIG. 3 is an explanatory diagram illustrating the wear testing device of FIG. 1 in a side view.

A wear testing device 1 according to an embodiment of the present technology illustrated in FIGS. 1 to 3 (hereinafter, referred to as a testing device 1) can simultaneously perform a wear test on a plurality of rubber samples S1, S2. The testing device 1 includes a holding portion 3 that holds each of the rubber samples S1, S2, a rotation body 4 disposed opposed to each of the rubber samples S1, S2, and a pressing mechanism 5 associated with each of the rubber samples S1, S2. These components are supported directly or indirectly by a support frame erected on a base 2. In this embodiment, the testing device 1 further includes a receiving box 6 disposed beneath each of the rubber samples S1, S2, and the majority of the testing device 1 is covered by a safety cover 13.

The number (two in this embodiment) of the holding portions 3 provided corresponds to the number of the rubber samples S1, S2. The holding portions 3 are rotationally driven rotation shafts. The holding portions 3 hold and rotate the disk-shaped rubber samples S1, S2.

The rotation bodies 4 each include a circumferential surface that comes into contact with the rubber sample S1, S2 and are, for example, a rotationally driven disc-shaped grinding wheel. The rubber sample S1, S2 and the circumferential surface of the rotation body 4 opposing the rubber sample S1, S2 come into contact with each other.

One independent pressing mechanism 5 is provided for each rubber sample S1, S2. The pressing mechanism 5 applies a pressing force to the rubber sample S1, S2 pushing it toward the circumferential surface of the opposing rotation body 4.

The pressing mechanism 5 includes a slide frame 5a disposed on the support frame erected on the base 2 that supports the holding portion 3. The slide frame 5a is slidable in a direction toward and away from the opposing rotation body 4. For example, a cord such as a wire with an elastic member such as a spring or a weight attached is connected to the slide frame 5a to urge the slide frame 5a toward the opposing rotation body 4. The slide frame 5a is urged toward the rotation body 4 by such an elastic member or weight, so that a pressing force is applied to the rubber sample S1, S2.

A discretionary pressing force can be applied to the rubber samples S1, S2 by changing the configuration of the elastic member or weight of the weight. The pressing mechanism 5 is not limited to the structure according to this embodiment and may have a structure in which the rubber samples S1, S2 are independently pressed against the circumferential surface of the rotation body 4.

A handle 12 is installed on one end portion of a rotation shaft 4a that the rotation body 4 is attached to. Only the handle 12 is disposed outside the safety cover 13. By rotating the handle 12 by hand about the rotation shaft 4a in one direction, the rotation bodies 4 are rotationally driven in one direction.

Gears 9a, 9b are attached to the rotation shaft 4a, and other gears 9c, 9d that mesh with these gears 9a, 9b are installed below. Pulleys 10a, 10b are provided on the same shaft as the gears 9c, 9d. Other pulleys 10c, 10d are disposed on the shaft connected with the holding portions 3. The pulley 10a and the pulley 10c are disposed with opposing circumferential surfaces, and the pulley 10b and the pulley 10d are disposed with opposing circumferential surfaces. Transmission belts 11a, 11b are mounted on the opposing pulley 10a and pulley 10c and the opposing pulley 10b and the pulley 10d.

When the handle 12 is rotated in one direction, the rotation shaft 4a is rotationally driven in one direction. This drives the gears 9a, 9b and the rotation bodies 4 to rotate about the rotation shaft 4a in one direction. When the gears 9a, 9b rotate, the meshed gears 9c, 9d and the pulleys 10a, 10b are rotationally driven in the other direction. This drives the pulleys 10c, 10d and the rubber samples S1, S2 to rotate in the other direction. Thus, the circumferential surfaces of the rotation bodies 4 and the rubber samples S1, S2 come into contact with each other in a reverse rotational manner.

At this time, the in-contact rotation bodies 4 and the rubber samples S1, S2 differ in terms of speed (peripheral velocity) at the contact surface. That is, the rotationally driven rotation bodies 4 come into contact with and slip against the rubber samples S1, S2 to abrade the rubber samples S1, S2. The ratio of the speed of the rotation bodies 4 and the rubber samples S1, S2 at the contact surface (slip ratio) can be discretionarily set depending on the ratio between the outer diameters of the rotation bodies 4 and the rubber samples S1, S2, the ratio between the outer diameters of the opposing gears 9 and the pulleys 10, and the like. The speed of the rubber samples S1, S2 at the contact surface is, for example, set to from 5% to 250% of the speed of the rotation bodies 4.

The rotation direction of the rubber samples S1, S2 and the rotation bodies 4 are set so that abrasion debris R of the rubber samples S1, S2 falls down. Thus, the rubber samples S1, S2 and the rotation body 4 are rotationally driven from up to down toward their opposing counterpart. The receiving boxes 6 are preferably disposed centered below the position where the samples S1, S2 and the rotation bodies 4 come into contact.

Next, the method of performing wear testing on the rubber samples S1, S2 using the testing device 1 will be described.

The test objects, the rubber samples S1, S2, are held by the holding portions 3. For example, the rubber samples S1, S2 held may be of different types of rubber. Alternatively, in a case in which the rubber samples S1, S2 held are of the same type of rubber, the compounding agents or the compounding ratio of the compounding agents may differ.

Next, the pressing mechanisms 5 apply a predetermined pressing force to the rubber samples S1, S2. For example, the same pressing force may be applied to the rubber samples S1, S2.

Then, the handle 12 is manually rotated. This drives the rubber samples S1, S2 to rotate in the reverse direction to the opposing rotation bodies 4, and presses the rubber samples S1, S2 against the circumferential surfaces of the opposing rotation bodies 4 with a predetermined pressing force. The rubber samples S1, S2 come into contact with and slip against the rotationally driven rotation bodies 4, causing the rubber samples S1, S2 to wear. The abrasion debris R falls downward. The fallen abrasion debris R is received in the separate receiving boxes 6.

In the testing device 1 according to an embodiment of the present technology, the rubber samples S1, S2 are simultaneously and independently pressed against the circumferential surfaces of the rotating rotation bodies 4. Thus, the wear test can be conducted with the rubber samples S1, S2 under a constant predetermined pressing force, without the wear condition of the rubber samples S1, S2 being a factor. Accordingly, when the amounts (volume or weight) of the abrasion debris R from the rubber samples S1, S2 are compared to one another, the accurate, relative wear resistance (wear amount per unit time) of the rubber samples S1, S2 can be determined.

Furthermore, because the abrasion debris R of the rubber samples S1, S2 falls downward, the abrasion debris R can be visually observed and the amounts can be compared to one another to easily determine the relative wear resistances of the rubber samples S1, S2. Note that the slide frames 5a slide only a small amount during the wear test so that the tension of the transmission belts 11a, 11b is kept from being too low and so that the rotational drive of the rubber samples S1, S2 and the rotation bodies 4 is not affected. Also, when the wear amount of the rubber samples S1, S2 is great or the test takes a long time so that the slide amount of the slide frames 5a is great, a tensioner may be provided to keep the transmission belts 11a, 11b at a constant tension.

In this embodiment, the rubber samples S1, S2 and the rotation bodies 4 are rotationally driven manually. This allows the operator of the testing device 1 to gain a feel for the force (rotational driving force) required to abrade the rubber samples S1, S2. By manually applying the rotational driving force and gaining a feel for the relationship between this and the amount of abrasion debris R, the operator of the testing device 1 can gain a strong impression of the wear resistance of the rubber samples S1, S2. Accordingly, at an event such as an exhibition, when a visitor uses the testing device 1, the difference in the relative wear resistance of the rubber samples S1, S2 is striking.

By rotating the handle 12 in the reverse direction to the preset one direction, the abrasion debris R flies upward. To prevent such trouble, the rotation direction (an arrow indicating one direction) of the handle 12 is preferably specified on the safety cover 13 or the like.

Figure 4:
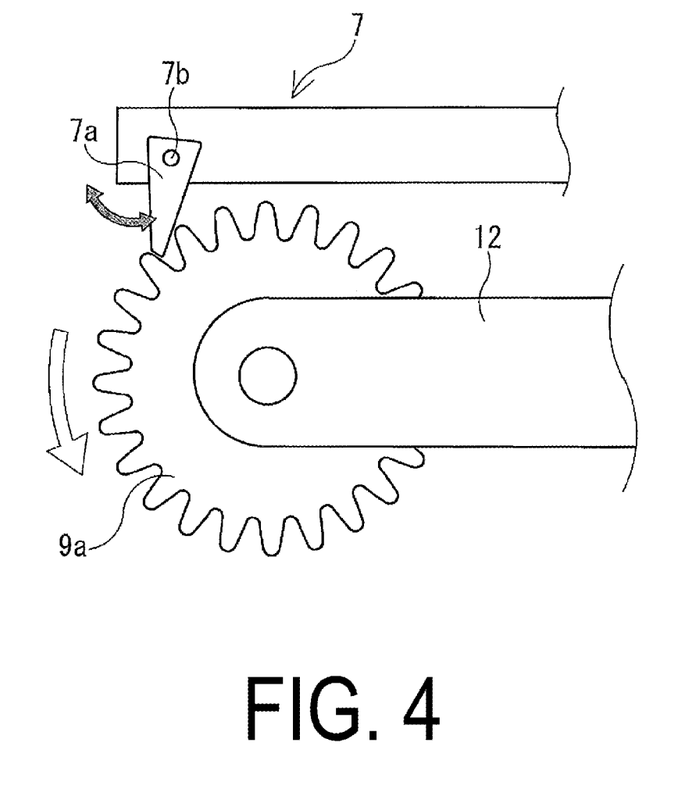
FIG. 4 is an explanatory diagram illustrating a rotational restricting mechanism in a side view.

Alternatively, as illustrated in FIG. 4, a rotational restricting mechanism 7 can be provided that restricts movement in one direction of the rotation direction of the rotation body 4. The rotational restricting mechanism 7 includes a wedge body 7a that is in contact with the outer circumferential teeth of the gear 9a in a constant state of bias at a predetermined angle. The wedge body 7a is pivotally supported by a support shaft 7b in a manner allowing for rotation.

When the handle 12 (gear 9a) is rotated in one direction, the outer circumferential teeth of the gear 9a rotates the wedge body 7a about the support shaft 7b against the biasing force, allowing the handle 12 (gear 9a) to be smoothly rotationally driven in one direction. In this way, the rotation bodies 4 and the rubber samples S1, S2 are smoothly rotationally driven. When the handle 12 (gear 9a) is rotated in the reverse direction from the one direction, the wedge body 7a is wedged between two outer circumferential teeth of the gear 9a, and the rotation of the handle 12 (gear 9a) is locked. In this way, the rotation bodies 4 and the rubber samples S1, S2 are prevented from being rotationally driven. Any rotational restricting mechanism 7 that restricts movement in one direction of the rotation direction of the rotation body 4 can be used.

Figure 5:
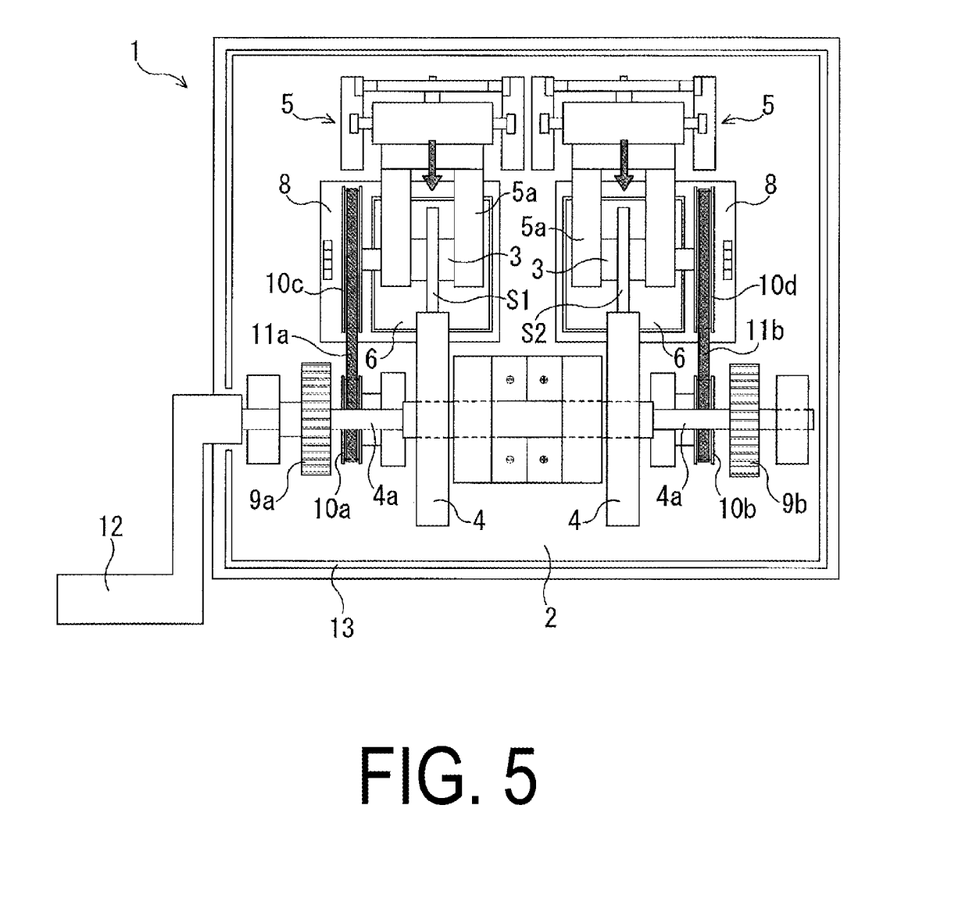
FIG. 5 is an explanatory diagram illustrating a wear testing device according to another embodiment in a plan view.
Figure 6:
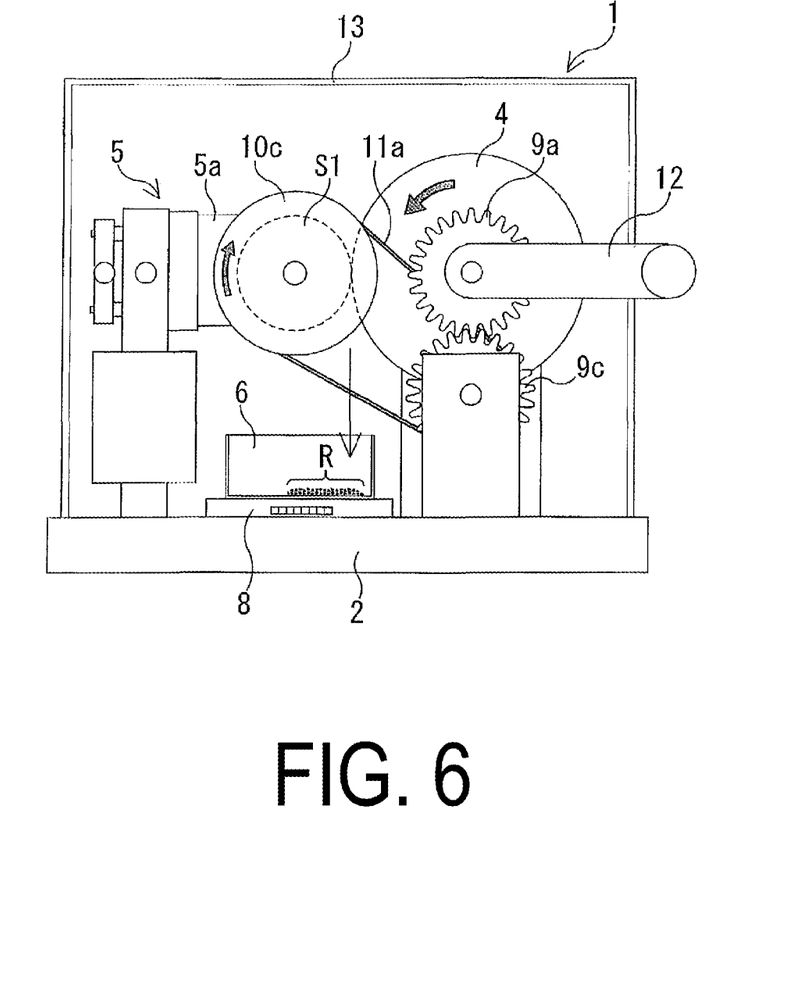
FIG. 6 is an explanatory diagram illustrating the wear testing device of FIG. 5 in a side view.

As illustrated in FIGS. 5 and 6, a weighing device 8 can be provided that measures the abrasion debris R of the rubber samples S1, S2. For example, each receiving box 6 is placed on a weighing device 8. In this way, the weight of the abrasion debris R can be accurately determined in real-time, further allowing the relative wear resistance of a plurality of rubber samples to be easily determined.

As the wear test continues, the abrasion debris R is deposits and accumulates on the circumferential surface of the rotation body 4. When an excessive amount of the abrasion debris R is deposited, wear conditions may be affected. Thus, a scraper or the like that comes into contact with the circumferential surface of the rotation body 4 is preferably provided, providing a configuration in which the abrasion debris R is removed from the circumferential surface.

The mechanism for transmitting the rotational driving force input from the handle 12 to the rotation bodies 4 and the rubber samples S1, S2 is not limited to the mechanism described in this embodiment, and various transmission components and transmission mechanism can be used. For example, a toothed belt or the like that prevents a decrease in the transmission rate due to slippage of the transmission belts 11a, 11b can be used.

In this embodiment, the two rubber samples S1, S2 are tested simultaneously. However, in another embodiment, three or more can be simultaneously tested. In such an embodiment, preferably, the number of holding portions 3 and pressing mechanisms 5 matches the number of rubber samples simultaneously tested. In one embodiment, the number of the rotation bodies 4 may also match the number of the rubber samples, and in another embodiment, two rubber samples may be placed on opposite sides of the rotation body 4 so that, for testing, two rubber samples can be simultaneously brought into contact with the circumferential surface of one rotation body 4.

The testing device 1 can determine the relative wear resistance of the rubber samples S1, S2 under the same conditions with the applied pressing force and the slip ratio being the same and also perform various wear tests. For example, two rubber samples S1 of the same specifications can be simultaneously wear tested under different conditions (pressing force and the slip ratio). This wear test can be performed to easily determine the relative degree of affect, or how much of an affect different conditions have on the wear resistance of the rubber sample S1 with such specifications.

The rotation bodies 4 and the rubber samples S1, S2 can be rotationally driven using a drive source such as a motor, instead of manual rotation. In such a case, for example, preferably, a motor or the like that rotates the rotation shaft 4a of FIG. 1 is provided.

In this embodiment, the rubber samples S1, S2 are rotationally driven. However, in another embodiment, the rubber samples S1, S2 can be pressed against the circumferential surfaces of the rotating rotation bodies 4 in an unmovable state. For example, block-shaped rubber samples S1, S2 can be held by the holding portions 3 and pressed against the circumferential surfaces of the rotation bodies 4 and abraded.

The structure of the testing device 1 can be simplified by such a configuration in which the rubber samples S1, S2 are pressed in an unmovable state. However, in a configuration in which the rubber samples S1, S2 are rotationally driven, as in the embodiment described above, instead of only one end of each of the rubber samples S1, S2 being extremely abraded, the circumferential surface is uniformly abraded, allowing for a more reliably evaluation to be performed.

The invention claimed is:

1. A wear testing device, comprising:
a holding portion that holds a rubber sample;
a rotation body comprising a circumferential surface that comes into contact with the rubber sample;
a handle configured to manually rotationally drive the rotation body such that the rotation body is rotationally driven with manual rotation of the handle; and
a pressing mechanism that applies a pressing force on the rubber sample held by the holding portion toward the circumferential surface;
the wear testing device comprising a plurality of holding portions, and rubber samples held by each of the plurality of holding portions being independently and simultaneously pressed against the circumferential surface of the rotation body in rotation such that abrasion debris produced via contact between each of the rubber samples and the circumferential surface falls downward.

2. The wear testing device according to claim 1, wherein each of the rubber samples are brought into contact with the circumferential surface at a contact surface of the rubber samples and rotationally driven in a direction opposite that of the rotation body at a speed that differs from a speed of the rotation body.

3. The wear testing device according to claim 1, further comprising a plurality of receiving boxes that separately receive the abrasion debris of each of the rubber samples.

4. The wear testing device according to claim 1, further comprising a weighing device that measures a weight of the abrasion debris of each of the rubber samples.

5. The wear testing device according to claim 1, further comprising a rotational restricting mechanism that restricts movement in one direction of a rotation direction of the rotation body.

6. A wear testing device, comprising:
a holding portion that holds a rubber sample;
a rotation body comprising a circumferential surface that comes into contact with the rubber sample;
a handle configured to manually rotationally drive the rotation body such that the rotation body is rotationally driven with manual rotation of the handle;
a pressing mechanism that applies a pressing force on the rubber sample held by the holding portion toward the circumferential surface;
the holding portion comprising a plurality of holding portions, and the rubber sample held by each of the plurality of holding portions being independently and simultaneously pressed against the circumferential surface of the rotation body in rotation such that abrasion debris produced via contact between the rubber sample held by each of the plurality of holding portions and the circumferential surface falls downward; and a plurality of receiving boxes, disposed below the position where the rubber sample held by each of the plurality of holding portions and the rotation bodies come into contact, that separately receive the abrasion debris of the rubber sample held by each of the plurality of holding portions, and a weighing device, on which the receiving boxes are placed, that measures a weight of the abrasion debris of the rubber sample held by each of the plurality of holding portions.

7. The wear testing device of claim 6, wherein the receiving boxes and the weighing device are placed and configured to enable visual observation of the amount of abrasion of the rubber sample held by each of the plurality of holding portions in real time, in order to enable determination of relative wear resistance of the rubber sample held by each of the plurality of holding portions.

\* \* \* \* \*